Patented July 31, 1923.

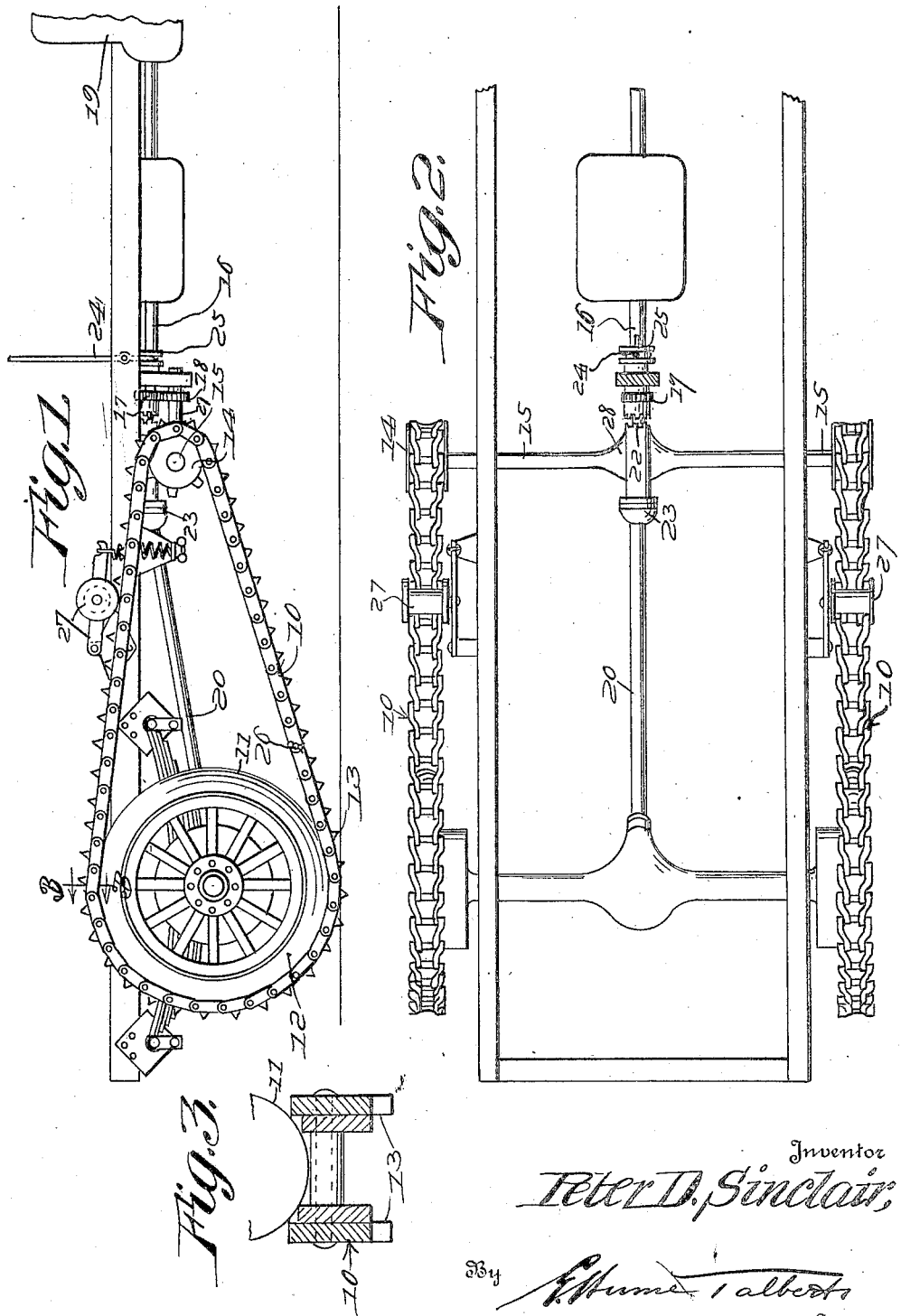

1,463,728

UNITED STATES PATENT OFFICE.

PETER D. SINCLAIR, OF MARION, NORTH CAROLINA.

VEHICLE TRANSMISSION GEAR.

Application filed June 15, 1921. Serial No. 477,720.

*To all whom it may concern:*

Be it known that PETER D. SINCLAIR, a citizen of the United States of America, residing at Marion, in the county of McDowell and State of North Carolina, has invented new and useful Improvements in Vehicle Transmission Gears, of which the following is a specification.

The object of the invention is to provide a simple and efficient transmission gear for vehicles of the truck, tractor and similar types preferably as an interchangeable or selected means of communicating motion from the motor to the traction wheels and adapted for use on particularly heavy or loose surfaced roads; and with this object in view the invention consists in a construction and combination of parts of which a preferred embodiment is shown in the accompanying drawings, wherein:—

Figure 1 is a side view of a transmission gear embodying the invention applied in the operative position to a vehicle of which a portion is shown in outline.

Figure 2 is a plan view of the same.

Figure 3 is a detail sectional view on the plane indicated by the line 3—3 of Figure 1.

The transmission gear embodying the invention includes a traction unit 10 consisting of an endless chain having an inner surface conforming to the tread 11 of a traction wheel 12 having either a pneumatic or cushion tire, said traction unit being provided exteriorly if desired with suitable spaced spurs 13 and being extended around a drive sprocket 14 carried by a differential countershaft 15 disposed for example in perpendicularity with the motor shaft 16 and adapted to receive motion therefrom through the intermeshing gears 17 and 18. The motor indicated at 19 is adapted as in the ordinary practice to communicate motion to the drive shaft 20 extending as in the ordinary practice to the differential gear on the rear axle, but in order that the motor may serve to drive the traction wheels either in the ordinary way through the drive shaft 20 or through the transmission mechanism embodying this invention, the gear 17 is keyed upon the motor shaft 16 and carries a clutch face as indicated, for engagement with a complemental clutch face 22 on a coupling 23 carried by the drive shaft 20, suitable shifting mechanism consisting of a lever 24 and a grooved collar 25 being employed to enable the operator to adjust the parts as the conditions of operation of the truck or tractor may require. When the clutch member 17 is shifted to interlock with the member 22 and thus communicate motion from the motor directly to the drive shaft 20 the gear 17 is disengaged from the gear 18, whereas when the lever 24 is reversed in position to disengage the drive shaft 20 motion is communicated from the motor shaft directly through the gear 18 to the countershaft 15 for actuating the endless chain constituting the traction unit. Obviously the chain 10 should be provided with a removable pin 26 to permit of disengaging the ends of the same for removal when not required and a suitable chain tightener 27 may be employed to ensure a proper frictional engagement of the traction unit with the tread of the traction wheel 12.

Having described the invention, what is claimed as new and useful is:—

The combination with a vehicle having driving wheels, a transmission shaft communicating motion thereto and a driving motor, of a differential countershaft carried by the vehicle, and having sprockets on its extremities, endless traction elements engaged with the driving wheels and with the sprockets, a clutch interposed between the transmission shaft and the motor, a pinion carried by one of the elements of said clutch, a pinion operatively connected with the differential countershaft, and means for operating the pinion carrying the clutch element to move it toward and away from the complemental element whereby when the clutch elements are engaged the pinion is moved laterally to mesh with the pinion connected with the countershaft, reengagement of the pinions being effected by the disengagement of the clutch elements.

In testimony whereof he affixes his signature.

PETER D. SINCLAIR.